United States Patent
Daniels et al.

[11] Patent Number: 5,991,401
[45] Date of Patent: Nov. 23, 1999

[54] METHOD AND SYSTEM FOR CHECKING SECURITY OF DATA RECEIVED BY A COMPUTER SYSTEM WITHIN A NETWORK ENVIRONMENT

[75] Inventors: Scott Leonard Daniels, Cedar Park; Terry Dwain Escamilla, Austin; Danny Marvin Neal, Round Rock; Yat Hung Ng, Austin, all of Tex.

[73] Assignee: International Business Machines Corporation, Armonk, N.Y.

[21] Appl. No.: 08/761,548

[22] Filed: Dec. 6, 1996

[51] Int. Cl.⁶ .............................. H04K 1/06; H04L 9/12; H04L 9/28
[52] U.S. Cl. .................................. 380/9; 380/23; 380/25; 380/49
[58] Field of Search .................................. 380/21, 23, 25, 380/30, 49, 50

[56] References Cited

U.S. PATENT DOCUMENTS

| | | | |
|---|---|---|---|
| 4,193,131 | 3/1980 | Lennon et al. | 375/2 |
| 4,264,782 | 4/1981 | Konheim | 178/22 |
| 4,349,695 | 9/1982 | Morgan et al. | 178/22.08 |
| 4,601,011 | 7/1986 | Grynberg | 364/900 |
| 4,916,704 | 4/1990 | Bruckert et al. | 371/68.8 |
| 5,237,611 | 8/1993 | Rasmussen et al. | 380/21 |
| 5,255,367 | 10/1993 | Bruckert et al. | 395/200 |
| 5,276,859 | 1/1994 | Reede | 395/550 |
| 5,490,252 | 2/1996 | Macera et al. | 395/200.1 |
| 5,781,632 | 7/1998 | Odom | 380/24 |

*Primary Examiner*—Tod R. Swann
*Assistant Examiner*—Justin Darrow
*Attorney, Agent, or Firm*—Richard A. Henkler; Antony P. Ng; Andrew J. Dillon

[57] ABSTRACT

A method for checking security of data received by a computer system within a network environment is disclosed. In accordance with a preferred embodiment of the present invention, an incoming packet from a client is first decrypted within a receiving communications adapter by utilizing a master decryption key. The decrypted incoming packet is then encrypted by utilizing an encryption key identical to an encryption key employed by the client. A determination is made as to whether or not a packet produced from the encryption is identical to the incoming packet. In response to a determination that a packet produced from the encryption is identical to the incoming packet, the decrypted incoming packet is forwarded to a system memory of the computer system. As such, any incoming packet that does not meet this criterion will be rejected as a security threat.

16 Claims, 3 Drawing Sheets

METHOD AND SYSTEM FOR CHECKING SECURITY OF DATA RECEIVED BY A COMPUTER SYSTEM WITHIN A NETWORK ENVIRONMENT

BACKGROUND OF THE INVENTION

1. Technical Field

The present invention relates to a method and system for data processing in general and, in particular, to a method and system for providing data security in a computer system. Still more particularly, the present invention relates to a method and system for checking security of data received by a computer system within a network environment.

2. Description of the Prior Art

Today's world of network computing is a highly open environment. By taking advantage of such openness, industries are providing various kinds of resources, services, and information to the consuming public through computer networks such as the Internet. For example, banks are providing on-line banking and bank card authorization for payment to their customers. Digital cash transactions and business transactions in the form of electronic commerce may be conducted on the Internet. In addition, consumers may order goods and services via the Internet. Even on a personal level, a vast amount of electronic mail is being sent via the Internet everyday. For better or worse, there is no doubt that network computing on the Internet changes the way most people run their lives.

The advantage of openness in a computer network, however, also comes with the necessary threat of data security. In fact, the urge to protect information and resources within the world of electronic commerce are some of the reasons that industries and individuals are demanding stricter data security in the widely unprotected network-computing environment. For example, a merchant may want to protect his or her profits by making sure a business transaction is properly conducted with payment securely received. A bank may want to ensure the identity of a payee before any "money" is transferred in order to prevent fraud. An individual may want certain personal information or electronic mail to be encrypted so that only the intended recipients can read them.

Currently, data security in a network-computing environment is provided via data-security-checking software, such as virus protection software. This data-security-checking software typically resides in the system memory of a receiving computer. After receiving a stream of data from the network, the receiving computer will first load the incoming data into the system memory, in which the data-security-checking software operates upon the data, before the data is utilized. However, if the security technique is breached, the offending data has already been allowed into the system memory of the receiving computer such that damage may be done. Consequently, it would be desirable to provide an improved method and system for checking security of data received by a computer system within a network environment.

SUMMARY OF THE INVENTION

In view of the foregoing, it is therefore an object of the present invention to provide an improved method and system for data processing.

It is another object of the present invention to provide an improved method and system for providing data security in a computer system.

It is yet another object of the present invention to provide an improved method and system for checking security of data received by a computer system within a network environment.

In accordance with a preferred embodiment of the present invention, an incoming packet from a client is first decrypted within a receiving communications adapter by utilizing a master decryption key. The decrypted incoming packet is then encrypted by utilizing an encryption key identical to an encryption key employed by the client. A determination is made as to whether or not a packet produced from the encryption is identical to the incoming packet. In response to a determination that a packet produced from the encryption is identical to the incoming packet, the decrypted incoming packet is forwarded to a system memory of the computer system. As such, any incoming packet that does not meet this criterion will be rejected as security threat.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention may be executed in a variety of computer systems under a number of different operating systems. In addition, the computer system may be a stand-alone system or part of a network such as a local-area network (LAN) or a wide-area network (WAN). For the purpose of illustration, a preferred embodiment of the present invention, as described below, is implemented on a personal computer, such as the Aptiva™, having an operating system, such as OS/2™, both manufactured by International Business Machines Corporation.

Figure 1:
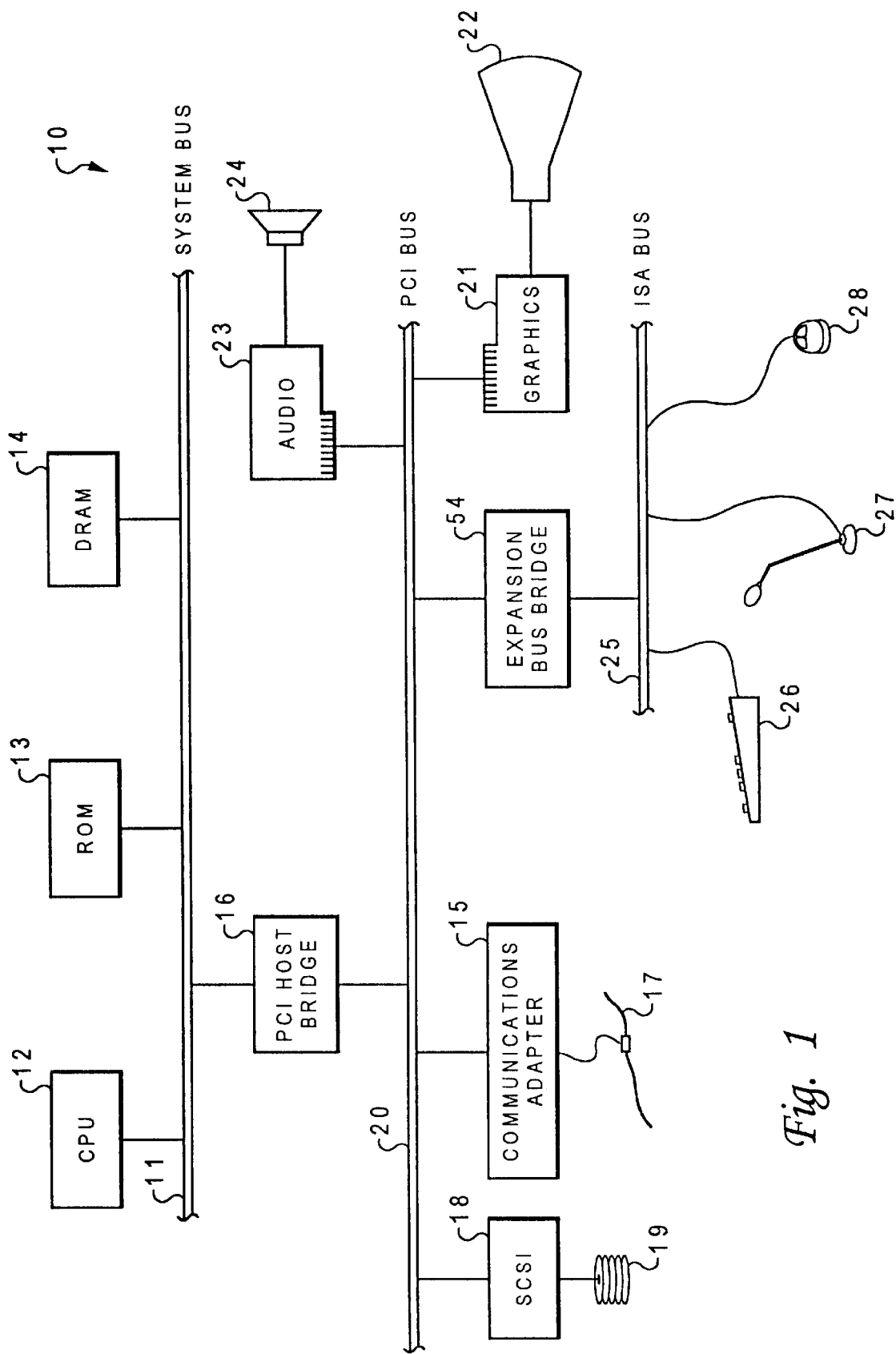
FIG. 1 is a diagram of a typical computer system which may be utilized in conjunction with a preferred embodiment of the present invention.

Referring now to the drawings and in particular to FIG. 1, there is depicted a diagram of a typical computer system 10 which may be utilized in conjunction with a preferred embodiment of the present invention. As shown, a central processing unit (CPU) 12, a read-only memory (ROM) 13, and a Dynamic Random Access Memory (DRAM) 14 are connected to a system bus 11 of a computer system 10. CPU 12, ROM 13, and DRAM 14 are also coupled to a PCI local bus 20 of computer system 10 through a PCI host bridge 16. PCI host bridge 16 provides a low latency path through which processor 12 may directly access PCI devices mapped anywhere within bus memory and/or I/O address spaces. PCI host bridge 16 also provides a high bandwidth path allowing PCI devices to directly access DRAM 14.

Also attaching to PCI local bus 20 is communications adapter 15. In addition, a small computer system interface (SCSI) 18 and an expansion bus interface 54 may be attached to PCI local bus 20. Communications adapter 15 is for connecting computer system 10 to a local-area network 17. SCSI 18 is utilized to control high-speed SCSI disk drive 19. Expansion bus interface 54, such as a PCI-to-ISA bus bridge, may be utilized for coupling ISA bus 25 to PCI local bus 20. As shown, a keyboard 26, a microphone 27, and a mouse 28 may be attached to ISA bus 25 for performing certain basic I/O functions.

In addition, an audio adapter 23 may be attached to PCI local bus 20 for controlling audio output through speaker 24. A graphics adapter 21 may also be attached to PCI local bus 20 for controlling visual output through display monitor 22.

Although the illustrated exemplary embodiment describes a PCI local bus 20 and an ISA bus 25, the present invention is not limited to these particular bus architectures. Rather, the present invention can be utilized in any multi-bus system having other different bus architectures.

Figure 2:
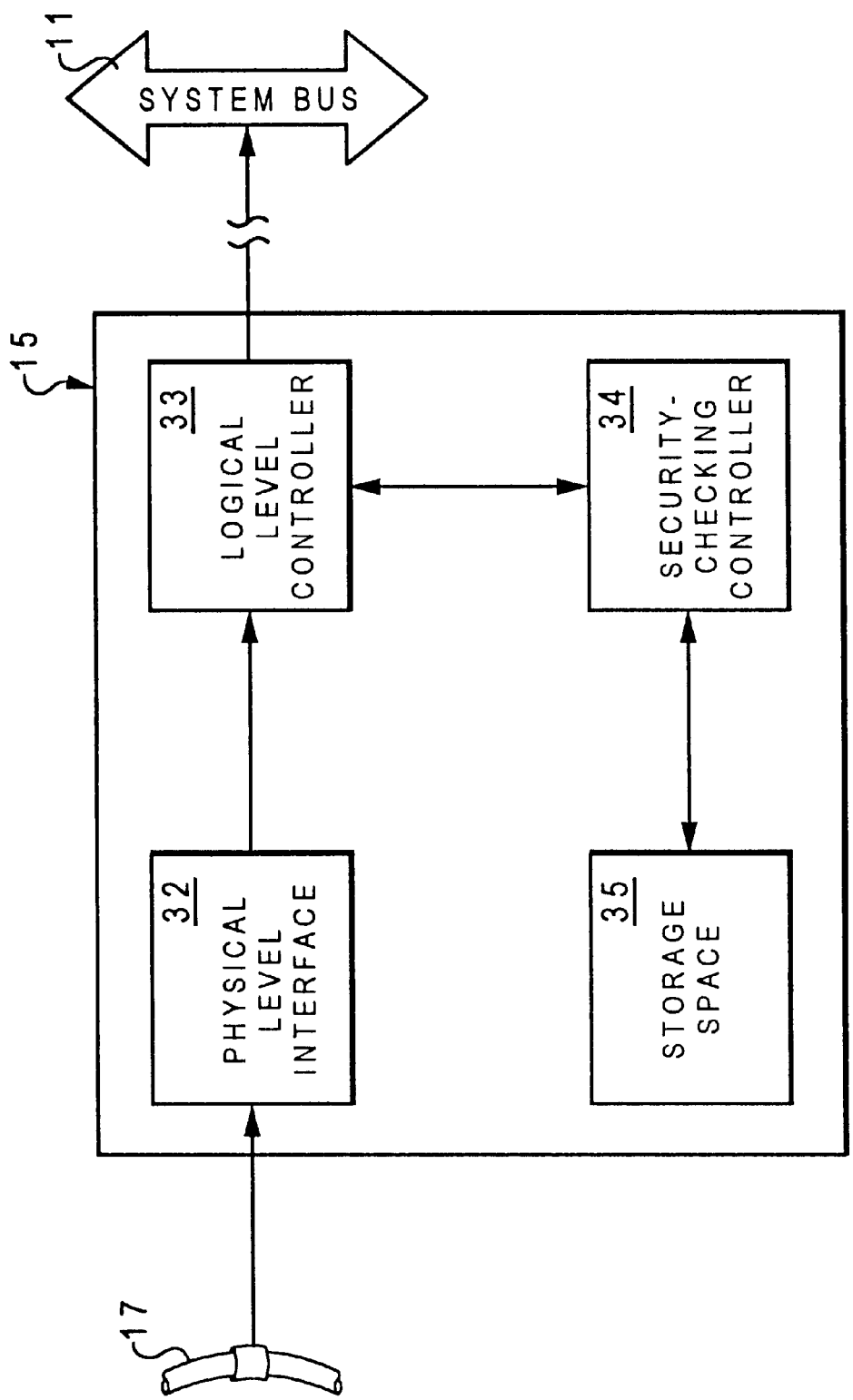
FIG. 2 is a block diagram of the communications adapter of FIG. 1, in accordance with a preferred embodiment of the present invention.

With reference now to FIG. 2, there is depicted a block diagram of communications adapter 15 of FIG. 1, in accordance with a preferred embodiment of the present invention. Communications adapter 15 may be an adapter intended for one of the many types of network such as Ethernet, Token-Ring, etc. As shown, communications adapter 15 comprises a physical level interface 32, a logical level controller 33, a security-checking controller 34, and a storage space 35. Physical level interface 32 contains the physical level protocol for interfacing to the network while logical level controller 33 contains the logical level protocol for processing incoming data. After receiving an incoming data from network 17, the data is first processed by physical level interface 32. The data is then passed on to logical level controller 33 in which the data is further processed. However, before the data is forwarded to the system memory of the computer system via system bus 11, the data is sent to security-checking controller 34 to determine whether or not a communicating client has utilized a proper encryption key for encrypting his/her data. It is assumed that the communicating client has previously been given an encryption key via one of the many secure methods that are well known to those who are skilled in the art. Storage system 35 is included in communication adapter 15 for the storage of encryption keys, which will be described below.

Data Encryption

Before a communicating client sends a packet to a receiving computer within a network, the communicating client must encrypt the outgoing packet with an encryption key. This encryption key is previously provided to the communicating client for the purpose of encrypting outgoing packets from the communicating client to the receiving computer. Only an approved communicating client within the network is provided with an encryption key via a trusted secure vehicle. Preferably, a unique encryption key is provided for each of the clients within the network who wish to communicate with the receiving computer, though it is not strictly required. The receiving computer retains a copy of each encryption key after it is sent to the communicating clients. In addition, the receiving computer also possesses a master decryption key that can decrypt an incoming packet that is encrypted by any one of the encryption keys previously provided. The master decryption key and any of the encryption keys are preferably stored in storage space 35 of communications adapter 15 of the receiving computer.

An alternative embodiment to the master decryption key implementation is to utilize a multiple decryption-encryption key pairs. Only an encryption key of the decryption-encryption key pair will be provided to a communicating client while the receiving computer retains the decryption key and a copy of the encryption key previously sent. The decryption-encryption key pair is preferably stored in storage space 35 of communications adapter 15 of the receiving computer. Regardless of which embodiment is being utilized, the receiving computer always maintains the knowledge of what encryption key is in which client's possession.

Data Decryption

Figure 3:
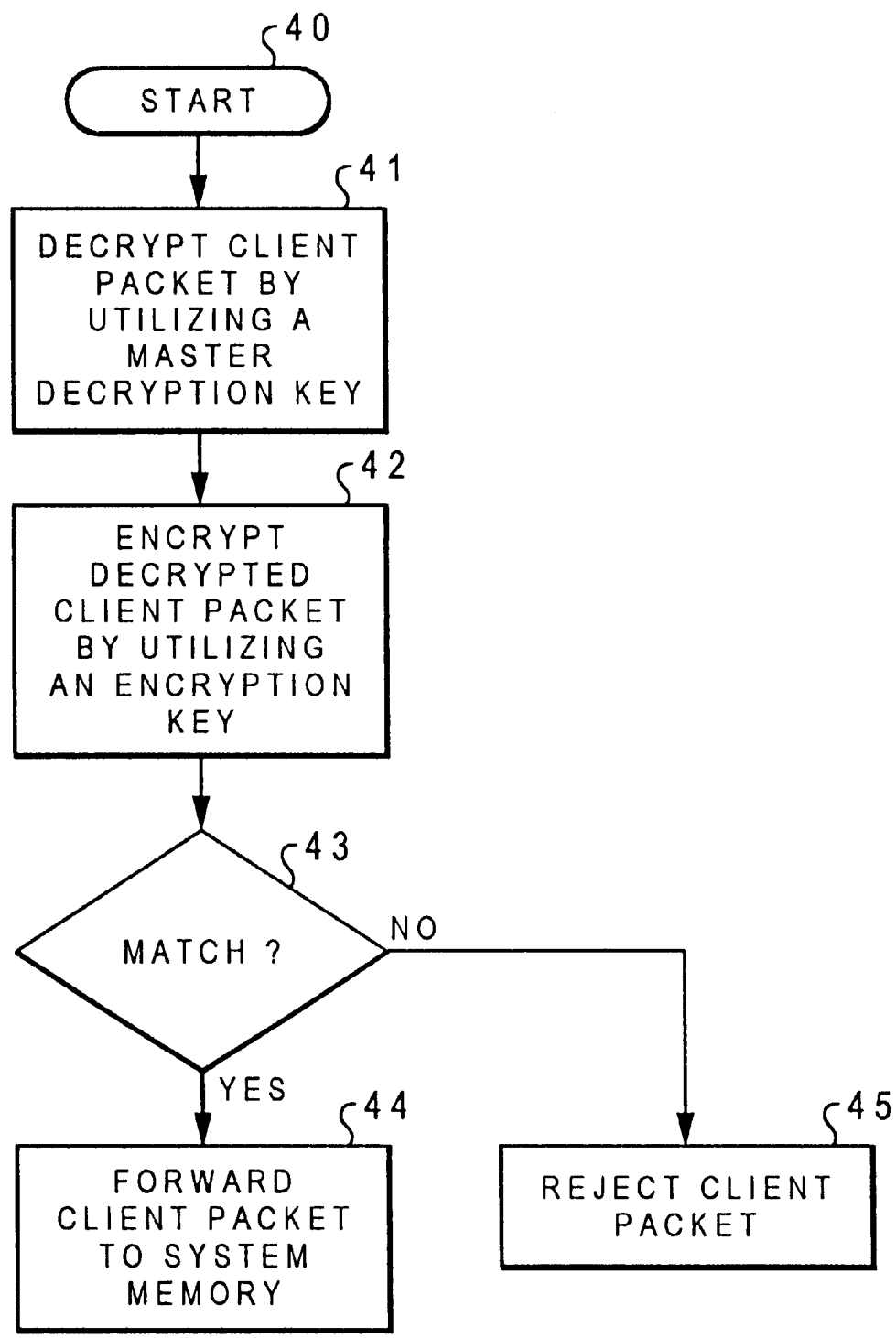
FIG. 3 is a high-level logic flow diagram of a method for checking security of data received by a computer system within a network environment, in accordance with a preferred embodiment of the invention.

Referring now to FIG. 3, there is illustrated a high-level logic flow diagram of a method of checking security of data received by a computer system within a network environment, according to a preferred embodiment of the present invention. The following steps are preferably performed within the communications adapter of FIG. 2. Starting at block 40, an incoming client packet (previously encrypted by a communicating client) is first decrypted by utilizing a master decryption key, as shown in block 41. This decryption key is readily available from the storage space of the communications adapter. The decrypted client packet is then encrypted by utilizing an encryption key, as depicted in block 42. This encryption key should be the same encryption key utilized by the communicating client for encrypting its packet, and should be readily available from the storage space of the communications adapter.

At this point, the encrypted client packet from block 42 is compared with the original incoming encrypted client packet from the communicating client, as shown in block 43. If the comparison is a match, the decrypted client packet is forwarded to the system memory, as depicted in block 44. The system memory may contain certain application-level protocols for further performing other types of software security checks. Otherwise, if the comparison is not a match, the client packet is rejected, as illustrated in block 45, because the communicating client does not have the proper encryption key. By performing a security check at the communications adapter level as described above, an added level of data security for the computer system in a network environment is provided.

As has been described, the present invention provides a method and system for checking security of data received by a computer system within a network environment. The present invention does not require any modifications to the existing standard communications protocols, but does require a modification to the hardware design of the communications adapter in order to utilize existing communication protocols as a means for an added security check at the communications adapter hardware level. A key benefit of providing a security check at the communications adapter is that potentially harmful packets from an unsafe client can be rejected (if the packets do not pass a security check) before the potentially harmful packets leave the communications adapter, and before the potentially harmful packets can gain residence in the system memory where they can possibly do more harm. By providing an additional security check in the communications-adapter level, it should be even more difficult for computer hackers to gain access to a computer system within the network environment.

Aspects of the present invention pertaining to specific "method functions" are implementable on computer systems. In an alternate embodiment, the present invention may be implemented as a computer program product for use with a computer system. Those skilled in the art should readily appreciate that programs defining the functions of the present invention can be delivered to a computer in many forms, which include, but are not limited to: (a) information permanently stored on non-writable storage media (e.g., read-only memory devices within a computer such as ROM or CD-ROM disks readable by a computer I/O attachment); (b) information alterably stored on writable storage media (e.g. floppy disks and hard drives); or (c) information conveyed to a computer through communication media, such as network and telephone networks, via modem. It should be understood, therefore, that such media, when carrying computer-readable instructions that direct the method functions of the present invention, represent alternate embodiments of the present invention.

While the invention has been particularly shown and described with reference to a preferred embodiment, it will be understood by those skilled in the art that various changes in form and detail may be made therein without departing from the spirit and scope of the invention.

What is claimed is:

1. A method for checking security of data received by a computer system within a network environment, wherein said data is generated by a client computer system within said network environment, said method comprising the steps of:

decrypting an incoming encrypted packet received from a client computer system by utilizing a decryption key;

encrypting said decrypted incoming packet by utilizing an encryption key previously provided to said client computer system, wherein said encryption key is also assumed to be employed by said client computer system to encrypt said incoming encrypted packet;

determining whether or not a packet produced by said encrypting step is identical to said incoming encrypted packet; and in response to a determination that a packet produced by said encrypting step is identical to said incoming encrypted packet, accepting said decrypted incoming packet.

2. The method according to claim 1, wherein said method further includes a step of rejecting said incoming encrypted packet, in response to a determination that a packet produced by said encrypting step is not identical to said incoming encrypted packet.

3. The method according to claim 1, wherein said method further includes a step of providing an encryption key to a client computer system within said network environment.

4. The method according to claim 3, wherein said method further includes a step of producing said incoming encrypted packet by said client computer system via said encryption key.

5. The method according to claim 1, wherein said method is performed within a communications adapter of said computer system.

6. A computer system, within a network environment, capable of checking incoming data, said computer system comprising:

a communications adapter coupled to said network environment;

means for decrypting an incoming encrypted packet received from a client computer system by utilizing a decryption key;

means for encrypting said decrypted incoming packet by utilizing an encryption key previously provided to said client computer system, wherein said encryption key is also assumed to be employed by said client computer system to encrypt said incoming encrypted packet;

means for determining whether or not a packet produced by said encrypting step is identical to said incoming encrypted packet, within said communications adapter; and means for accepting said decrypted incoming packet within said communications adapter, in response to a determination that a packet produced by said encrypting step is identical to said incoming packet.

7. The computer system according to claim 6, wherein said computer system further includes a means for rejecting said incoming encrypted packet within said communications adapter, in response to a determination that a packet produced by said encrypting step is not identical to said incoming encrypted packet.

8. The computer system according to claim 6, wherein said computer system further includes a means for providing an encryption key to a client computer system within said network environment.

9. The computer system according to claim 6, wherein said accepting means further includes a means for forwarding said decrypted incoming packet from said communications adapter to a system memory of computer system.

10. A computer program product residing on a computer-usable medium for checking security of incoming data to a computer system within a network environment, said computer program product comprising:

program code means for decrypting an incoming encrypted packet received from a client computer system by utilizing a decryption key;

program code means for encrypting said decrypted incoming packet by utilizing an encryption key previously provided to said client computer system, wherein said encryption key is also assumed to be employed by said client computer system to encrypt said incoming encrypted packet;

program code means for determining whether or not a packet produced by said encrypting step is identical to said incoming encrypted packet; and program code means for accenting said decrypted incoming packet, in response to a determination that a packet produced by said encrypting step is identical to said incoming encrypted packet.

11. The computer program product according to claim 10, wherein said computer program product further includes a program code means for rejecting said incoming encrypted packet, in response to a determination that a packet produced by said encrypting step is not identical to said incoming encrypted packet.

12. The computer program product according to claim 10, wherein said computer program product further includes a program code means for providing an encryption key to a client computer system within said network environment.

13. The computer program product according to claim 12, wherein said computer program product further includes a program code means for producing said incoming encrypted packet by said client computer system via said encryption key.

14. The computer program product according to claim 10, wherein said computer program product is utilized within a communications adapter of said computer system.

15. The method according to claim 1, wherein said accepting step further includes a step of forwarding said decrypted incoming packet to a system memory of said computer system.

16. The computer program product according to claim 10, wherein said program code means for accepting further includes a program code means for forwarding said decrypted incoming packet to a system memory of said computer system.

* * * * *